(12) United States Patent
Kwon et al.

(10) Patent No.: US 8,297,651 B2
(45) Date of Patent: Oct. 30, 2012

(54) PRE-CRASH SIDE AIR BAG DEVICE

(75) Inventors: Hyock In Kwon, Seongnam-si (KR);
Hyeong Ho Choi, Gwangmyeong-si (KR); Seung Woo Lee, Suwon-si (KR);
Jae Ho Choi, Seoul (KR); Jun Yeol Choi, Seoul (KR)

(73) Assignee: Hyundai Motor Company, Seoul (KR)

( * ) Notice: Subject to any disclaimer, the term of this patent is extended or adjusted under 35 U.S.C. 154(b) by 170 days.

(21) Appl. No.: 12/955,624

(22) Filed: Nov. 29, 2010

(65) Prior Publication Data

US 2012/0032425 A1 Feb. 9, 2012

(30) Foreign Application Priority Data

Aug. 6, 2010 (KR) .......................... 10-2010-0075875

(51) Int. Cl.
*B60R 21/233* (2006.01)
*B60R 21/239* (2006.01)
*B60R 21/0134* (2006.01)
*B60R 21/0136* (2006.01)
*B60R 21/231* (2011.01)

(52) U.S. Cl. ...................... 280/730.2; 280/729; 280/735; 280/739; 180/274; 701/45

(58) Field of Classification Search ............... 280/730.2, 280/730.1, 743.1, 743.2, 729, 735, 734, 739; 180/274, 271; 701/45
See application file for complete search history.

(56) References Cited

U.S. PATENT DOCUMENTS

| | | | |
|---|---|---|---|
| 5,333,899 A * | 8/1994 | Witte | 280/730.2 |
| 6,481,743 B1* | 11/2002 | Tobe et al. | 280/728.2 |
| 6,594,570 B2* | 7/2003 | Nagao et al. | 701/45 |
| 6,755,273 B2* | 6/2004 | Breed | 180/274 |
| 6,851,706 B2* | 2/2005 | Roberts et al. | 280/730.1 |
| 8,145,386 B2* | 3/2012 | Harase et al. | 701/45 |
| 2004/0232666 A1* | 11/2004 | Sato et al. | 280/730.2 |
| 2009/0138160 A1* | 5/2009 | Iyoda | 701/45 |

* cited by examiner

*Primary Examiner* — Faye M Fleming
*Assistant Examiner* — Keith Frisby
(74) *Attorney, Agent, or Firm* — Morgan, Lewis & Bockius LLP (57) ABSTRACT

A pre-crash side airbag device includes a side collision detection sensor, a pre-crash sensor, a main airbag, an auxiliary airbag, and a control unit. The side collision detection sensor detects a collision occurring at the side of a vehicle. The pre-crash sensor detects physical quantities related to the speed of an approaching object. The main airbag is deployed when a control signal is input. The auxiliary airbag is coupled to one side of the main airbag. The control unit controls the deployment of the main airbag and the auxiliary airbag depending on a pre-crash case where a high-speed side collision is expected and a normal case where a low-speed side collision is expected or the measurement value is erroneous.

7 Claims, 7 Drawing Sheets

PRE-CRASH SIDE AIR BAG DEVICE

CROSS-REFERENCE TO RELATED APPLICATIONS

The present application claims priority to Korean Patent Application Number 10-2010-0075875 filed on Aug. 6, 2010, the entire contents of which application is incorporated herein for all purpose by this reference.

BACKGROUND OF THE INVENTION

1. Field of the Invention

The present invention relates generally to a pre-crash side airbag device which deploys a main airbag and an auxiliary airbag before collision happens when high-speed side collision is expected, so that a vehicle occupant is pushed in the direction opposite to the collision, thereby more actively protecting the vehicle occupant, that is, the present invention works in a more improved manner than the existing manner in which a main airbag is deployed to protect vehicle occupants in the event of a side collision.

2. Description of the Related Art

With the recently high interest in the safety of vehicle occupants together with the functions and convenience of vehicles, the importance of safety devices capable of safely protecting vehicle occupants to the utmost in the event of vehicle accidents has been gradually magnified.

From among various safety devices, particularly airbags function to prevent vehicle occupants from being injured in conjunction with seat belts in the event of a front or side vehicle collision.

Generally, airbags are classified into front airbags for protecting vehicle occupants in the event of a front vehicle collision and side airbags for protecting vehicle occupants in the event of side vehicle collision.

Such a side airbag is well known for usually including a side collision detection sensor, an airbag control unit, and a side airbag module. When side collision energy is input from another vehicle or an object, the side collision detection sensor detects the collision energy and sends the measurement value thereof to the airbag control unit.

The airbag control unit compares the measurement value received from the side collision detection sensor with a reference value, and determines whether to allow the deployment of the side airbag module. When an airbag cushion is deployed by the side airbag module, the head and ribs of a vehicle occupant are protected from the side collision energy.

Korean Patent Registration No. 512427 discloses a technology related to the side airbag of a vehicle. Here, auxiliary chambers are additionally provided in the respective sides of the chest chamber unit and head chamber unit of a main chamber, some of the gas filling the main chamber flows into the auxiliary chambers and the auxiliary chambers are inflated, so that the width of a side airbag can expand in both directions toward a vehicle occupant and the side of a vehicle body, with the result that the side airbag is inflated in both directions toward the vehicle occupant and the side of the vehicle body within a short time even though there is only a narrow gap between the vehicle occupant and the side of the vehicle body, thereby effectively minimizing the injury of a vehicle occupant by sufficiently protecting the vehicle occupant and especially by protecting the chest and head of the vehicle occupant.

However, with regard to a side airbag disclosed in Korean Patent Registration No. 512427, a side airbag is divided into a main chamber and an auxiliary chamber for the purpose of reducing the severity of injuries of a vehicle occupant, and has a mechanism for operating an airbag when vehicle collision actually occurs. Therefore, when a high-speed side collision occurs, the entry speed of collision energy is faster than the deployment speed of an airbag, so that the side airbag cannot be normally deployed, thereby creating a problem in that a vehicle occupant cannot be perfectly protected.

That is, in the event of a high-speed side collision in which the collision energy is considerable large, the side of a vehicle body is deformed and encroaches on the place where a vehicle occupant is seated, so that a collision between the side of the vehicle body and the vehicle occupant occurs. Therefore, there are problems in that a side airbag cannot be properly deployed due to the deformation of the side of a vehicle body, and in that, even though a side airbag is deployed, the interval between a vehicle occupant and the side of a vehicle body is narrow, so that a vehicle occupant cannot be sufficiently protected.

SUMMARY OF THE INVENTION

Accordingly, various aspects of the present invention have been made keeping in mind the above problems occurring in the prior art, and to safely protect a vehicle occupant from collision energy when a high-speed side collision is expected using a pre-crash sensor in such a way that the speed or acceleration of an object which is approaching the side of a vehicle is detected, and two airbags are deployed before the collision occurs, so that vehicle occupant is pushed away from the side of a vehicle body.

One aspect of the present invention is to protect a vehicle occupant when a low-speed side collision occurs or a pre-crash sensor is erroneous in such a way that a single airbag is deployed according to a general side airbag deployment procedure.

In order to accomplish various aspects, the present invention provides for a pre-crash side airbag device, including a side collision detection sensor configured to detect a collision occurring at the side of a vehicle, a pre-crash sensor disposed on the side of the vehicle, and configured to detect physical quantities related to the speed of an approaching object, a main airbag disposed between a vehicle occupant seat and the side of the vehicle, and deployed when a control signal is input, an auxiliary airbag coupled to one side of the main airbag so that the auxiliary airbag can be communicated with the main airbag, and a control unit configured to allow both the main airbag and the auxiliary airbag to be deployed even before the measurement value of the side collision detection sensor is input in a pre-crash case where a measurement value from the pre-crash sensor is received and a high-speed side collision is expected, and configured to allow the main airbag to be deployed after the measurement value of the side collision detection sensor is received in a normal case where the measurement value from the pre-crash sensor is received and a low-speed side collision is expected or the measurement value is erroneous.

The main airbag may include an open vent hole configured to always exhaust gas filling the inside of the main airbag to an outside, and a variable vent hole connected to the auxiliary airbag using a tether so as to be opened when the auxiliary airbag is not deployed and to be closed when the auxiliary airbag is deployed.

The variable vent hole includes: an opening/closing unit inflated and deflated so that the variable hole is opened and closed, and provided in a circumference of the variable hole, and the tether configured to surround the opening/closing unit so that the opening/closing unit is shut.

The variable vent hole is opened when the variable vent hole meets an opening formed in the predetermined area of the tether, and is closed when the variable vent hole does not meet the opening.

The side surfaces of the main airbag and auxiliary airbag are sewn along a sewing line, a breathing hole is formed in the inside area of the sewing line so that the gas of the main airbag can move to the auxiliary airbag, and an inflator for generating gas is formed on one side of the main airbag.

Here, in the pre-crash case, the thickness of the main airbag and auxiliary airbag is set so that a vehicle occupant can be moved in a direction opposite to a collision direction owing to the deployment of the main airbag and auxiliary airbag.

Further, in the normal case, the auxiliary airbag is disposed between the main airbag and the side of the vehicle so that the auxiliary airbag is not deployed because of contact due to side collision.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
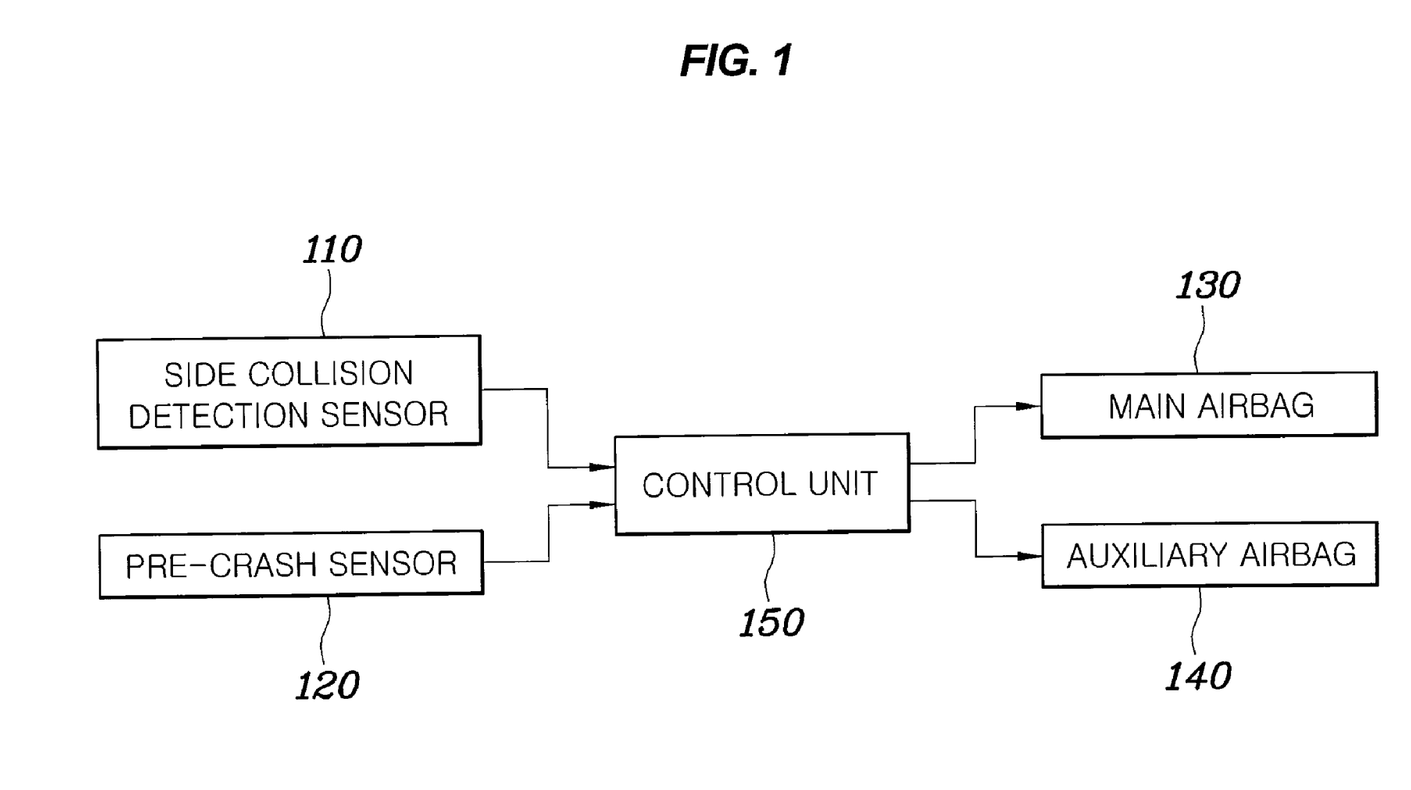
FIG. 1 is a block diagram showing the control structure of an exemplary pre-crash side airbag device according to the present invention.

First, as shown in FIG. 1, a pre-crash side airbag device according to the present invention largely includes a side collision detection sensor 110, a pre-crash sensor 120, a main airbag 130, an auxiliary airbag 140, and a control unit 150.

The side collision detection sensor 110 is installed in the predetermined location on the side of a vehicle, and is configured to detect a collision that will happen to the side of the vehicle body, and is configured to output a measurement value corresponding to the amount of the collision. Since the side collision detection sensor 110 corresponds to what is well-known, the detailed description thereof will be omitted.

Further, the pre-crash sensor 120 is installed in the predetermined location on a side 10 of a vehicle, is configured to detect physical quantities related to the speed of an object 20 (for example, another vehicle) which is approaching the side 10 of the vehicle, and is configured to output the value of such a physical quantity.

Here, the physical quantities related to speed refer to speed, acceleration, and distance. Since the pre-crash sensor 120 can measure the speed or acceleration of an approaching object 20 and can be aware of the distance from the approaching object 20, the physical quantities present reference which enables the control unit 150 to determine a high-speed collision and a low-speed collision.

That is, if an approaching object 20 is within a reference distance and the speed of the object 20 is equal to or faster than the reference speed, there is a low probability of avoiding the collision with the object 20 and there is a high probability of a high-speed collision. Meanwhile, if the speed of the object 20 is lower than the reference speed, there is a high probability of avoiding the collision with the object 20 and there is a high probability of a low-speed collision even in the event of a collision.

Figure 2:
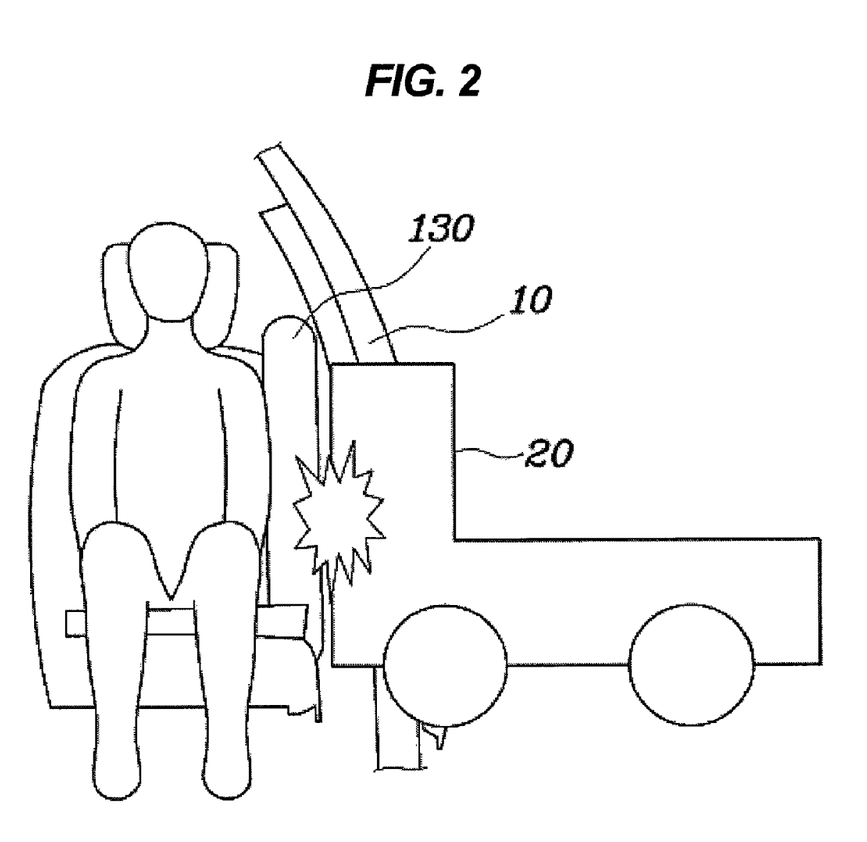
FIGS. 2 and 3 are reference views showing side airbag deployment in a normal condition of the present invention.
Figure 4:
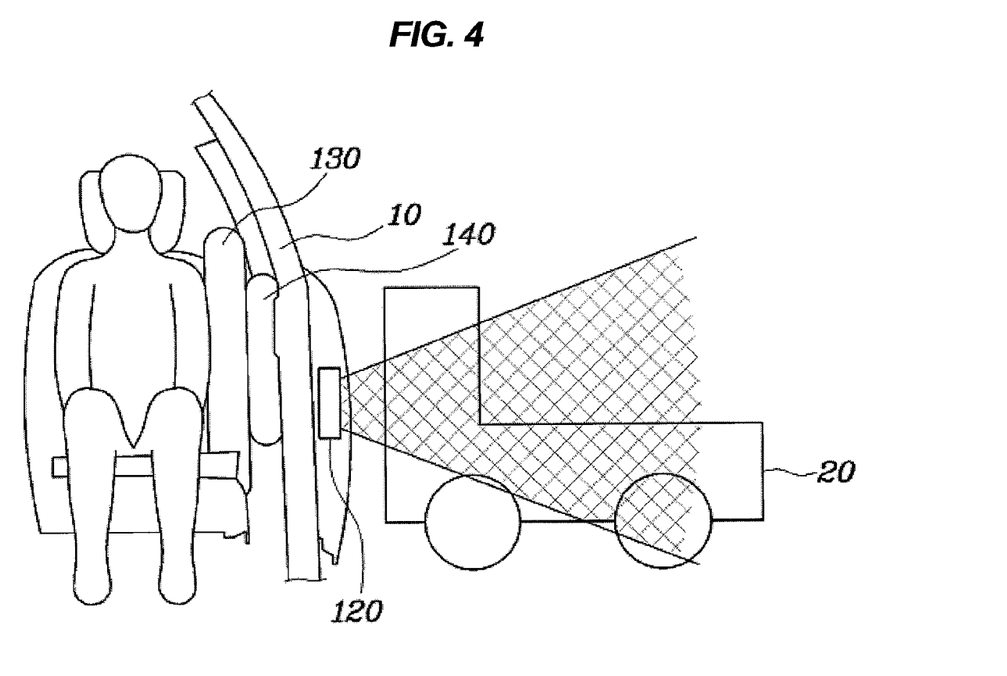
FIGS. 4 and 5 are reference views showing side airbag deployment in a pre-crash condition of the present invention.

The main airbag 130 is provided between a vehicle occupant seat and the side 10 of the vehicle as shown in FIGS. 2 and 4, and is deployed by filling it with gas when a control signal is received from the control unit 150 which will be described later.

Figure 3:
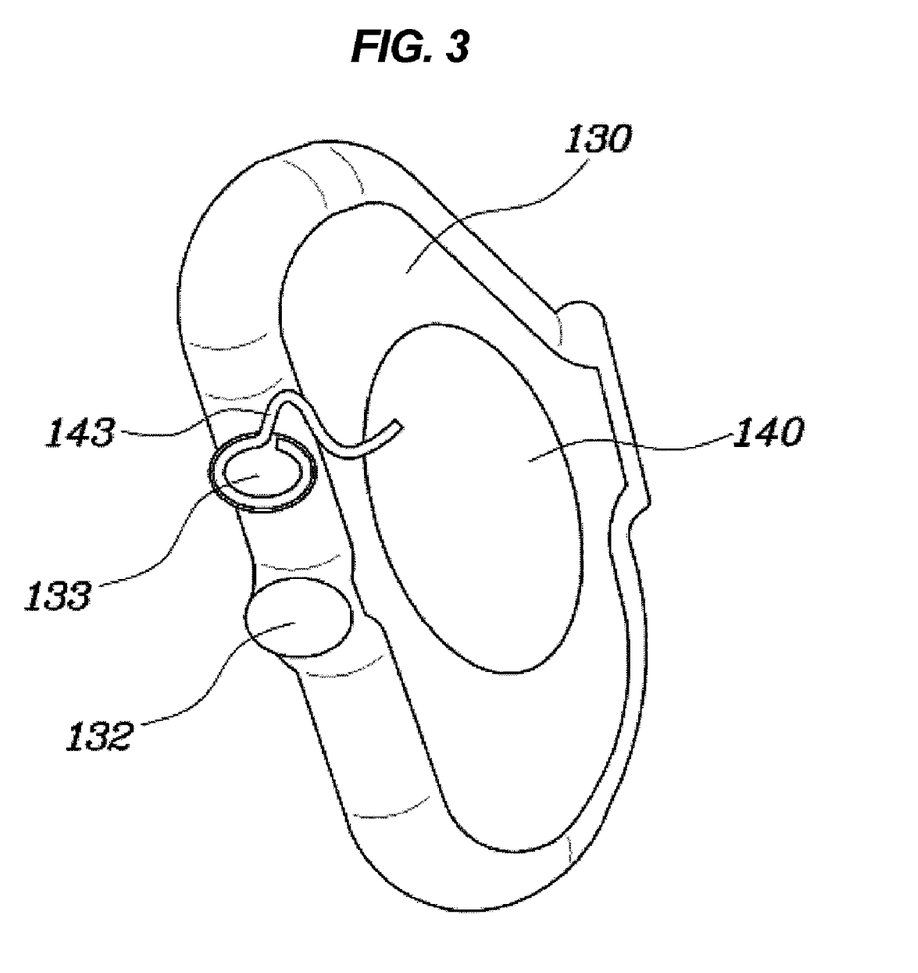
Figure 5:
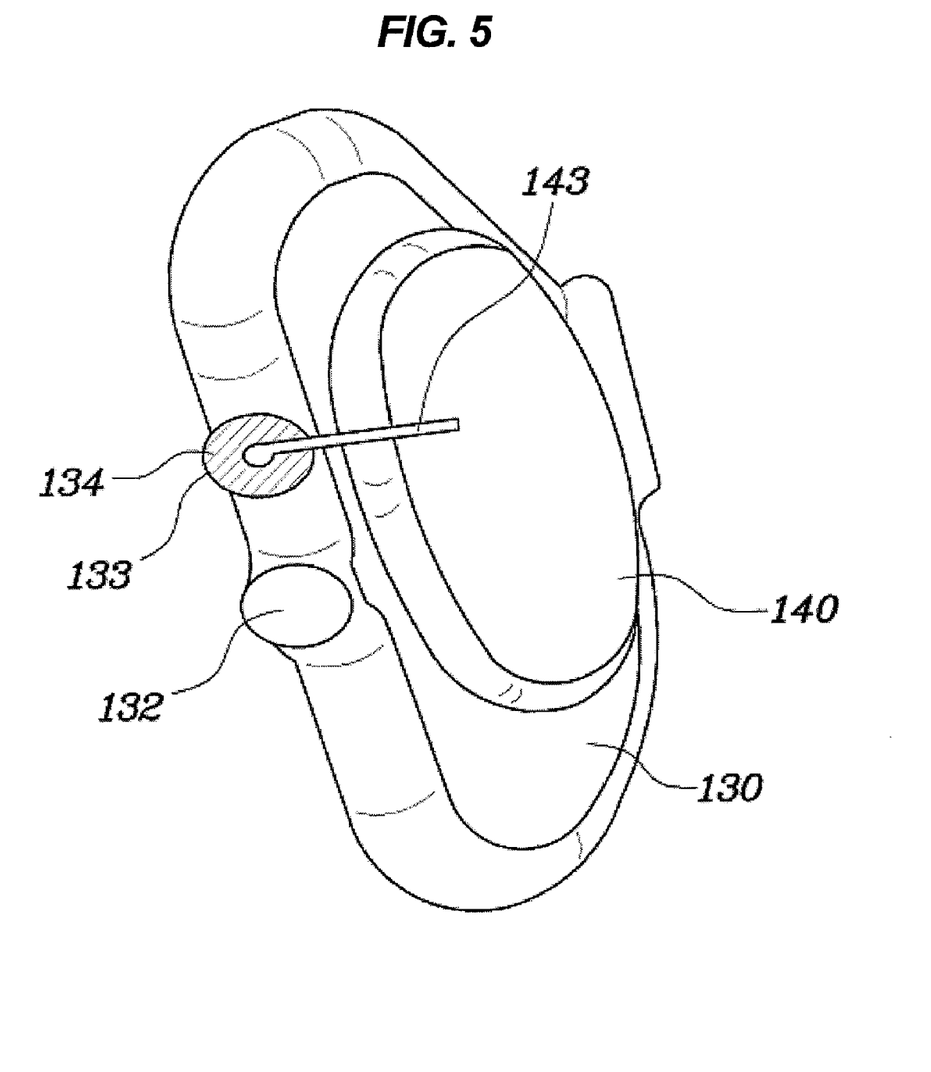
Figure 6:
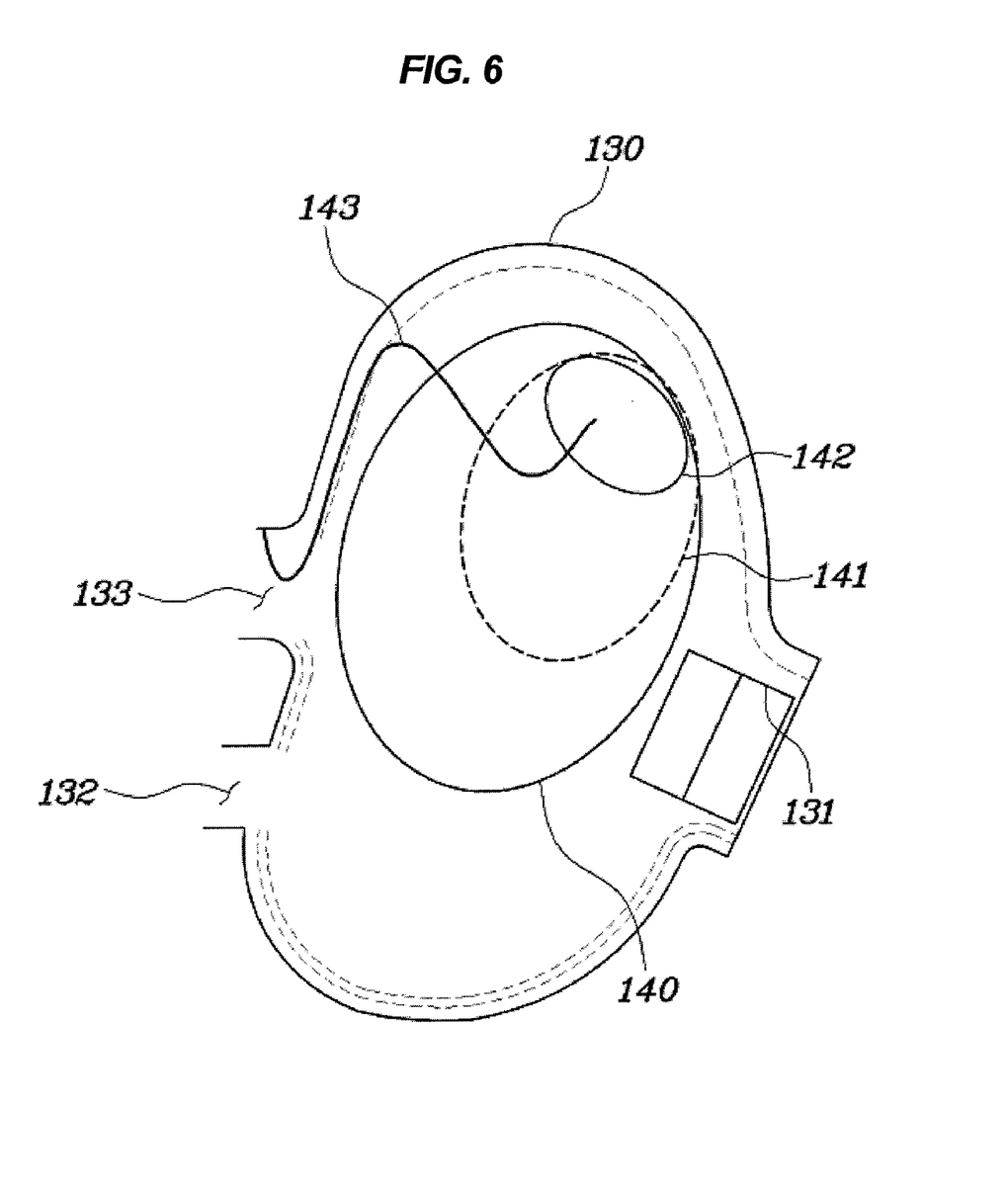
FIG. 6 is a sectional view showing an exemplary coupling structure of a main airbag and a side airbag according to the present invention.

Further, the auxiliary airbag 140 is coupled to one side of the main airbag 130 so that they can be communicated with each other as shown in FIGS. 3, 5 and 6, and the coupling structure thereof is clearly shown in FIG. 6.

FIG. 6 is a sectional view showing the main airbag 130 and the auxiliary airbag 140 superimposed on the main airbag 130 and coupled to one side of the main airbag 130 so that they can be fluidly communicated with each other. Here, the side surfaces of the main airbag 130 and auxiliary airbag 140 are sewed along a sewing line 141.

Here, in order for gas in the main airbag 130 to move into the auxiliary airbag 140, the main airbag 130 and the auxiliary airbag 140 should be fluidly communicated with each other. A breathing hole 142 is formed in the inner area of the sewing line 141 so that gas in the main airbag 130 can move to the auxiliary airbag 140.

Therefore, although the present invention includes two airbags, a single inflator 131 for generating gas is installed on one side of the main airbag 130 without two inflators being used, so that the main airbag 130 inflates first and then gas moves to the auxiliary airbag 140, thereby reducing the number of components, weight, and cost of airbags.

Meanwhile, as shown in FIGS. 3, 5, and 6, the main airbag 130 includes a vent hole for exhausting a predetermined amount of gas, generated by the inflator 131 and filling the main airbag 130, to the outside. The vent hole formed in the main airbag 130 includes an open vent hole 132 and a variable vent hole 133. The open vent hole 132 always exhausts the gas filling the main airbag 130 to the outside. The variable vent hole 133 is connected to the auxiliary airbag 140 by a tether so that the variable vent hole 133 is opened when the auxiliary airbag 140 is not deployed, but is closed when the auxiliary airbag 140 is deployed.

Since the open vent hole 132 is always open as shown in the drawing, a predetermined amount of gas is always exhausted to the outside when gas fills the main airbag. However, the opening/closing of the variable vent hole 133 is determined depending on whether the auxiliary airbag is deployed or not.

That is, the case where the auxiliary airbag 140 is deployed is a pre-crash case in which the auxiliary airbag 140 should be deployed together with the main airbag in such a way that the gas filling the main airbag 130 moves to the auxiliary airbag 140, so that the amount of gas to be exhausted to the outside should be reduced, thus the variable vent hole 133 should be closed when the auxiliary airbag 140 is deployed.

Further, in the normal case where the auxiliary airbag 140 is not deployed, there may be an excess of gas filling the main airbag 130. Therefore, the variable vent hole 133 should be opened so that the internal pressure of the main airbag 130 can be properly maintained.

Figure 7:
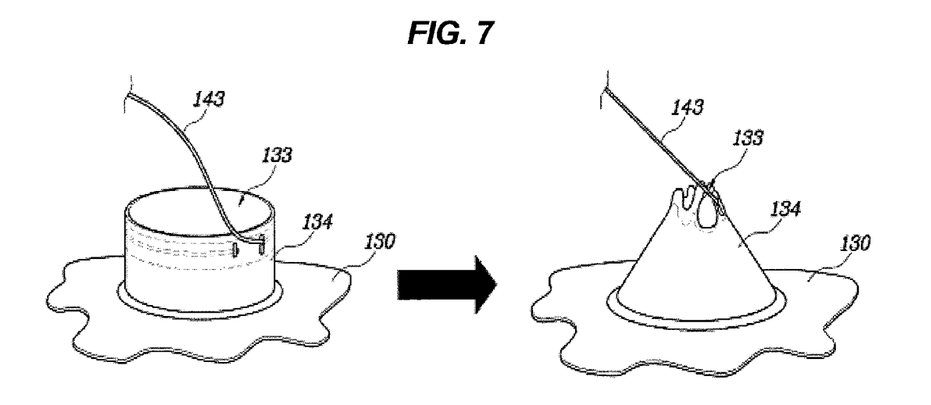
FIGS. 7 and 8 are views showing exemplary opening/closing structure of a variable vent hole according to the present invention.

Therefore, with regard to the variable vent hole 133, an opening/closing unit 134 is provided in the circumference of the variable vent hole 133 and a tether 143 surrounds the opening/closing unit 134 so as to shut the opening/closing unit 134 as shown in FIG. 7. The opening/closing unit 134 is inflated or deflated so that the variable vent hole can be opened or closed.

The tether 143 is connected to the auxiliary airbag 140 as shown in FIGS. 3 and 5. When the auxiliary airbag 140 is inflated, the tether 143 is pulled and the opening/closing unit 134 formed in the circumference of the variable vent hole 133 is shut, so that the variable vent hole 133 is closed.

Of course, when the auxiliary airbag 140 is not inflated as shown in FIG. 3, the tether 143 is not pulled and the opening/closing unit 134 is maintained while the opening/closing unit 134 is opened, so that the variable vent hole 133 is opened.

Figure 8:
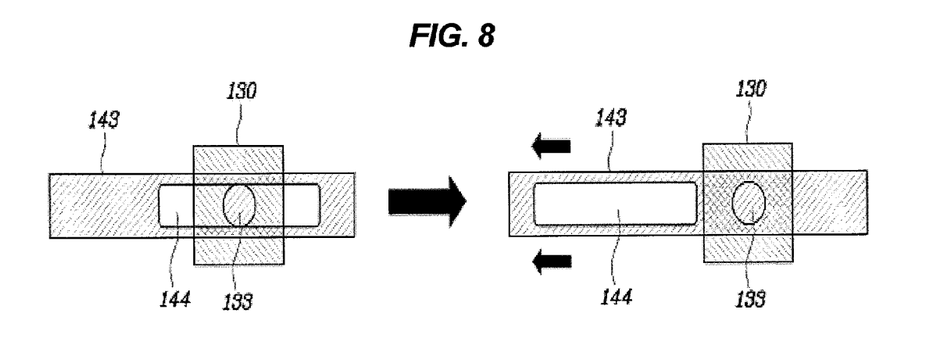

Meanwhile, the variable vent hole 133 may be formed as shown in FIG. 8. The tether 143 includes an opening 144 corresponding to a predetermined area. The variable vent hole 133 is opened when the variable vent hole 133 meets the opening 144, and the variable vent hole 133 is closed when the variable vent hole 133 does not meet the opening 144, as shown in FIG. 8.

Therefore, when the auxiliary airbag 140 is not deployed, the tether 143 is not pulled, so that the variable vent hole 133 meets the opening 144, with the result that the variable vent hole 133 is opened. When the auxiliary airbag 140 is inflated and the tether 143 is pulled, the variable vent hole 133 does not meet the opening 144, so that the variable vent hole 133 is closed by the tether 143.

Meanwhile, in the pre-crash case where a high-speed side collision is expected when the control unit 150 receives a measurement value from the pre-crash sensor 120, the control unit 150 allows both the main airbag 130 and the auxiliary airbag 140 to be deployed even before the measurement value of the side collision detection sensor 110 is input.

Of course, the principal of deploying both the main airbag 130 and the auxiliary airbag 140 is actualized in such a way that the control unit 150 sends a control signal to an inflator 131 installed in the main airbag 130 so that the inflator 131 fills the main airbag 130 with gas, and that the gas moves to the auxiliary airbag 140 and causes the auxiliary airbag 140 to be inflated and, at the same time, the variable vent hole 133 to be closed.

In the pre-crash case as shown in FIG. 4, it is preferable that the thickness of the main airbag 130 and auxiliary airbag 140 be properly set so that a vehicle occupant can be moved in the direction opposite to the collision direction owing to the deployment of the main airbag 130 and auxiliary airbag 140. Here, it is preferable that the total thickness of the main airbag 130 and auxiliary airbag 140 be set to be a value equal to or greater than 150 mm so that the vehicle occupant can be moved while impact can be sufficiently absorbed.

As described above, if a vehicle occupant is pushed and moved to the center of the inside of a vehicle owing to the deployment of the main airbag 130 and auxiliary airbag 140, the vehicle occupant becomes more distant from the side 10 of the vehicle, so that the vehicle occupant does not directly collide with the body of the vehicle which encroaches on the inside of the vehicle while becoming deformed in the event of a high-speed collision, thereby largely reducing the severity of the injuries of the vehicle occupant.

Further, in the normal case where a low-speed side collision is expected or a measurement value from the pre-crash sensor 120 is erroneous when the control unit 150 receives the measurement value from the pre-crash sensor 120, the control unit 150 ignores the measurement value of the pre-crash sensor 120 and allows only the main airbag 130 to be deployed using only the measurement value of the side collision detection sensor 110.

Here, the principle of not deploying the auxiliary airbag 140 and deploying only the main airbag 130 is actualized based on the fact that the main airbag 130 is deployed after receiving the signal of the side collision detection sensor 110. That is, since the object 20 which applies collision energy to the side 10 of the vehicle has already come in contact with the vehicle body and such a collision is already in progress, the auxiliary airbag 140 is pressured by the external force because of the contact due to the collision and cannot be deployed, so that only the main airbag 130 is deployed.

In the normal case where the auxiliary airbag 140 is not deployed because of the contact due to the side collision as described above, it is preferable that the auxiliary airbag 140 be disposed between the main airbag 130 and the side 10 of the vehicle so that collision energy is applied to the auxiliary airbag 140 first before being applied to the main airbag 130.

According to the present invention, when a low-speed side collision is expected or a pre-crash sensor is erroneous, a vehicle occupant is protected in such a way that only the main airbag is deployed according to a general side airbag deployment procedure in the event of a side collision, and, when a high-speed side collision is expected, a main airbag and an auxiliary airbag are previously deployed before the side collision occurs, so that a vehicle occupant is pushed to the center of the inside of the vehicle and collision energy is effectively blocked, with the result that there is an advantage of largely reducing the severity of the injuries of vehicle occupants.

For convenience in explanation and accurate definition in the appended claims, the terms "front", "inside" or "outside", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:
1. A pre-crash side airbag device, comprising:
a side collision detection sensor configured to detect a collision occurring at a side of a vehicle;
a pre-crash sensor disposed on the side of the vehicle, and configured to detect physical quantities related to a speed of an approaching object;
a main airbag disposed between a vehicle occupant seat and the side of the vehicle, and deployed when a control signal is received;

an auxiliary airbag coupled to one side of the main airbag so that the auxiliary airbag can be communicated with the main airbag; and a control unit configured to allow both the main airbag and the auxiliary airbag to be deployed even before a measurement value of the side collision detection sensor is received in a pre-crash case where a measurement value from the pre-crash sensor is received and a high-speed side collision is expected, and configured to allow the main airbag to be deployed after the measurement value of the side collision detection sensor is received in a normal case where the measurement value from the pre-crash sensor is received and a low-speed side collision is expected or the measurement value is erroneous.

2. The pre-crash side airbag device as set forth in claim 1, wherein the main airbag comprises:

an open vent hole configured to always exhaust gas filling an inside of the main airbag to an outside; and a variable vent hole connected to the auxiliary airbag using a tether so as to be opened when the auxiliary airbag is not deployed and to be closed when the auxiliary airbag is deployed.

3. The pre-crash side airbag device as set forth in claim 2, wherein the variable vent hole comprises:

an opening/closing unit inflated and deflated so that the variable hole is opened and closed, and provided in a circumference of the variable hole; and the tether configured to surround the opening/closing unit so that the opening/closing unit is shut.

4. The pre-crash side airbag device as set forth in claim 2, wherein the variable vent hole is opened when the variable vent hole meets an opening formed in a predetermined area of the tether, and is closed when the variable vent hole does not meet the opening.

5. The pre-crash side airbag device as set forth in claim 1,
wherein side surfaces of the main airbag and auxiliary airbag are sewn along a sewing line;
wherein a breathing hole is formed in an inside area of the sewing line so that gas of the main airbag can move to the auxiliary airbag; and
wherein an inflator for generating gas is formed on one side of the main airbag.

6. The pre-crash side airbag device as set forth in claim 1, wherein, in the pre-crash case, a thickness of the main airbag and auxiliary airbag is set so that a vehicle occupant can be moved in a direction opposite to a collision direction owing to deployment of the main airbag and auxiliary airbag.

7. The pre-crash side airbag device as set forth in claim 1, wherein, in the normal case, the auxiliary airbag is disposed between the main airbag and the side of the vehicle so that the auxiliary airbag is not deployed because of contact due to side collision.

* * * * *